United States Patent [19]

Chung et al.

[11] Patent Number: 4,842,740

[45] Date of Patent: Jun. 27, 1989

[54] MEMBRANES PREPARED FROM BLENDS OF POLYBENZIMIDAZOLE WITH POLYARYLATES

[75] Inventors: Tai-Shung Chung, Morris Plains; Paul N. Chen, Sr., Gillette; Vincent J. Provino, Clifton, all of N.J.

[73] Assignee: Hoechst Celanese Corporation, Somerville, N.J.

[21] Appl. No.: 228,624

[22] Filed: Aug. 5, 1988

[51] Int. Cl.$^4$ ............................................. C08J 9/28
[52] U.S. Cl. .................... 210/500.27; 210/500.28; 210/500.37; 264/41; 521/64; 521/134; 521/138
[58] Field of Search .................. 210/500.27, 500.37, 210/500.28; 264/41; 521/64, 134, 138

[56] References Cited

U.S. PATENT DOCUMENTS

| | | | |
|---|---|---|---|
| 4,448,687 | 5/1984 | Wang | 210/500.39 |
| 4,693,824 | 9/1987 | Sansone | 210/500.28 |
| 4,693,825 | 9/1987 | Trouw | 210/500.39 |
| 4,746,472 | 5/1988 | Kohn | 210/500.27 |

Primary Examiner—Morton Foelak
Attorney, Agent, or Firm—Lynch, Cox, Gilman & Mahan

[57] ABSTRACT

This invention discloses novel membranes comprised of a blend of polyarylate and polybenzimidazole polymers. A membrane prepared from the blend of polybenzimidazole and polyarylate polymers exhibits enhanced properties over membranes prepared solely from either a polyarylate or a polybenzimidazole polymer. The addition of the polyarylate to the polybenzimidazole membrane allows the composition to be more thermally processable and less susceptible to moisture. The presence of the polybenzimidazole renders the polyarylate less reactive to solvents and increases its thermal stability. In addition, it has been surprisingly found that membranes prepared from the polybenzimidazole polyarylate blends show high regeneration capacity while retaining good flux ranges. The membranes prepared by this process exhibit good separation characteristics and provide an improved membrane with enhanced qualities over prior art membranes.

20 Claims, 1 Drawing Sheet

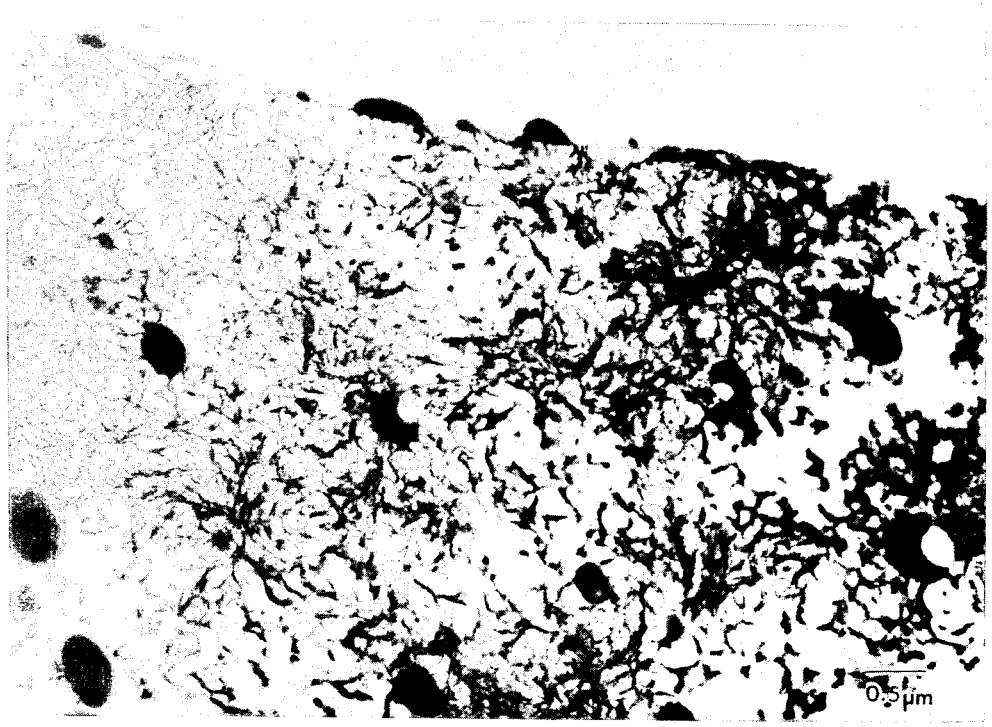

MEMBRANES PREPARED FROM BLEND OF POLYBENZIMIDAZOLE WITH POLYARYLATES

BACKGROUND OF INVENTION

1. Field of Invention

This invention relates to blends of polybenzimidazole polymers with polyarylate polymers. More particularly this invention relates to membranes produced from the blend of polybenzimidazole polymers and polyarylate polymers.

2. Prior Art

Polybenzimidazoles are a known class of heterocylic polymers which are characterized by a high degree of thermal and chemical stability. Processes for their production are disclosed in U.S. Pat. No. Re. 26,065, and U.S. Pat. Nos. 3,313,783, 3,509,108, 3,555,389, 3,433,772, 3,408,336, 3,549,603, 3,708,439, 4,154,919 and 4,312,976 (all patents are herein incorporated by reference). Polybenzimidazole polymers have been formed into membranes, ultrafilters, reverse osmosis devices and other types of separatory media of great utility.

While membranes and other products produced from polybenzimidazole polymers can be employed in electrodialysis, reverse osmosis and for a wide range of other separatory uses, the pore size of many polybenzimidazole products is quite small, i.e., less than about one angstrom. Thus, polybenzimidazole products are generally not useful as filter for molecules having molecular weights greater than about 1,000. In addition, the use of polybenzimidazole products is frequently impractical because of their relatively high cost.

Polyarylates are high temperature, high performance thermoplastic polymers with a good combination of thermal and mechanical properties. They also have good processability which allows them to be molded into a variety of useful articles. However, the utility of the polyarylates is severely limited in the aerospace industry, where resistance to paint strippers such as methylene chloride is required. Though generally resistant to chemical reaction, they are degraded when exposed to chlorinated solvents, ethylene glycol, N,N-dimethyl formamide and inorganic acids, such as hydrochloric acid, among others.

Polyarylates have frequently been blended with other types of materials to offset a defect in one material with a favorable characteristic of another material. For example, a material having a low heat distortion temperature but possessing other valuable characteristics, may be blended with a material having a high heat distortion temperature to improve the overall heat distortion characteristics of the blend.

U.S. Pat. No. 4,259,458 discloses polyarylates that have been blended with polyesters and at least one thermoplastic polymer selected from the group consisting of an aromatic polycarbonate, a styrene resin, an alkyl arylate resin, a polyurethane, a vinyl chloride polymer, a copolyetherester block polymer or a polyhydroxyether.

In addition, polyarylates blended with polyetherimides are disclosed in U.S. Pat. No. 4,250,279. Blends of polyarylates with polycarbonates have also been disclosed, for example, in U.S. Pat. Nos. 3,792,115, 3,864,428, 4,180,494, 4,189,579, 4,259,458, 4,264,487, 4,273,899, 4,286,075, 4,324,869 and 4,369,136.

U.S. Pat. No. 4,113,683 discloses the production of high temperature resistant polymer compositions capable of use in the formation of fiber reinforced composite articles. These articles are prepared from partially plasticized organic fibers derived from polymers comprised of a nitrogenous intractable, high temperature resistant polymer, such as a poly (bisbenzimidazobenzophenantholine), and related nitrogenous polymers, such as polybenzimidazoles, polyamides and high temperature aromatic polyesters. Onto these fibers is affixed a composition solution consisting of a nitrogenous intractable high temperature resistant polymer and an admixture comprising a major amount of the nitrogenous intractable, high temperature polymer previously discussed, and a minor amount of a crosslinkable polymer exhibiting a glass transition temperature of above 200° C. While this patent arguably discloses the use of a polybenzimidazole and a polyester as components of a polymer composition, it fails to disclose the specific mixture of a polybenzimidazole polymer with an aromatic polyester to form the product disclosed in this invention or the process for the production of that product.

Accordingly it is an object of the present invention to prepare polybenzimidazole/polyarylate blends.

It is a further object of this invention to prepare polybenzimidazole/polyarylate blends which are formed into membranes.

It is a further object of this invention to prepare membranes from a blend of a polybenzimidazole with a polyarylate which can separate a broad range of molecular weight compounds.

It is an additional object of this invention to prepare membranes from a blend of a polybenzimidazole with a polyarylate which membranes exhibit good ion exchange properties, microporous structure and high regeneration efficiency.

These and other objects, as well as the scope, nature, and utilization of the process and product will be apparent from the following description and appended claims.

SUMMARY OF INVENTION

In accordance with the present invention there is provided a polybenzimidazole/polyarylate product prepared by the process of:

(a) preparing a polybenzimidazole solvent solution;

(b) blending a polyarylate with the polybenzimidazole solvent solution; and (c) forming a membrane from the polybenzimidazole/polyarylate blend.

The membrane prepared by this process can be utilized as an ultrafilter which exhibits a broad range of molecular weight cut-offs. The membrane exhibits useful flux and rejection capabilities, valuable chemical absorption ability and exceptional regeneration capacity. It may be formed into high strength, chemically resistant membranes where the relatively large micropore size and high regeneration capability of the articles would be quite useful.

BRIEF DESCRIPTION OF THE DRAWINGS

FIG. 1 is a picture of the membrane morphology showing a fibrous network which contains large void areas and rounded to oval shaped particles.

DETAILED DESCRIPTION OF INVENTION

A. The Polybenzimidazole Starting Polymer

Polybenzimidazoles are a known class of heterocylic polymers which are characterized by a recurring monomeric unit which corresponds to the following Formulas I or II. Formula I is:

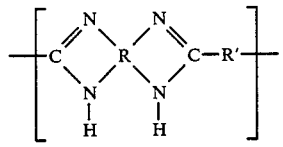

where R is a tetravalent aromatic nucleus with the nitrogen atoms forming the imidazole rings being paired upon adjacent carbon atoms, i.e., ortho carbon atoms, of the aromatic nucleus, and R' is a divalent substituent selected from aliphatic, alicyclic and aromatic radicals. Illustrative of R' substituents are divalent organic radicals containing between about 2-20 carbon atoms, such as ethylene, propylene, butylene, cyclohexylene, phenylene, pyridine, pyrazine, furan, thiophene, pyran, and the like.

Formula II corresponds to the structure:

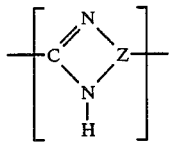

where Z is an aromatic nucleus having the nitrogen atoms forming the imidazole ring paired upon adjacent carbon atoms of the aromatic nucleus.

The above illustrated polybenzimidazoles can be prepared by various known processes, as described in the Background of Invention section.

The following generalized equation illustrates the condensation reaction which occurs in forming the polybenzimidazole having the recurring units of Formula I.

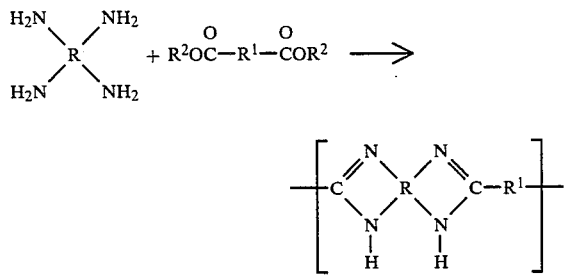

Such polybenzimidazoles are produced by the reaction of a mixture of (1) at least one aromatic tetraamine containing two groups of amine substituents, the amine substituents in each group being in an ortho position relative to each other, and (2) at least one dicarboxylate ester in which $R^1$ and $R^2$ in the compounds shown are substituents selected from aliphatic, alicyclic and aromatic groups.

Examples of polybenzimidazole which have the recurring structure of Formula I include:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,2'-(m-phenylene)-5,5'-diimidazobenzene;
poly-2,2'-(m-phenylene)-5,5'-di(bibenzimidazole)ether;
poly-2,2'-(m-phenylene)-5,5'-di(bibenzimidazole)sulfide;
poly-2,2'-(m-phenylene)-5,5'-di(bibenzimidazole)sulfone;
poly-2,2'-(m-phenylene)-5,5'-di(bibenzimidazole)methane;
poly-2,2"-(m-phenylene)-5,5"-di(benzimidazole)-propane-2,2; and
poly-2,2'-(m-phenylene)-5,5"-di(benzimidazole)-ethylene-1,2.

The preferred polybenzimidazole of Formula I is poly-2,2'-(m-phenylene)-5,5'-bibenzimidazole as characterized by the recurring monomeric unit:

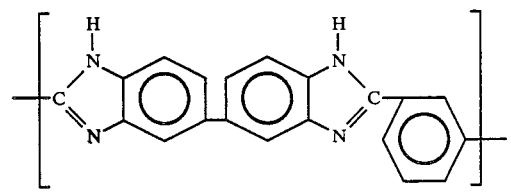

The polybenzimidazoles having the recurring monomer unit of Formula II can be prepared by the autocondensation of at least one aromatic compound having a pair of amine substituents in an ortho position relative to each other and a carboxylate ester group positioned upon an aromatic nucleus. Examples of such compounds are esters of diaminocarboxylic acids which include 3,4-diaminobenzoic acid; 5,6-diaminonaphthalene-1-carboxylic acids 5,6-diamino-naphthalene-2-carboxylic acid; 6,7-diaminonaphthalene-2-carboxylic acid, and the like. A preferred compound is 4-phenoxycarbonyl-3',4'-diaminodiphenyl ether:

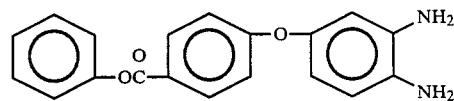

The polymer obtained with 4-phenoxycarbonyl-3',4'-diaminodiphenyl ether is poly-5-(4-phenyleneoxy)benzimidazole.

The polybenzimidazole starting material for the present invention process typically will exhibit an inherent viscosity between about 0.1-1.0 dl/g when measured at a concentration of 0.4 g of said polybenzimidazole in 100 ml of 97 percent sulfuric acid at 25° C.

The weight average molecular weight of a typical polybenzimidazole starting material will be in the range between about 1000-100,000.

B. The Polybenzimidazole Polymer Solution

The solvents utilized to form the polybenzimidazole polymer solution include those solvents which are commonly recognized as being capable of dissolving typical polybenzimidazole polymers. In addition, in a preferred embodiment the solvents should be capable of dissolving the particular polyarylate to be blended with the polybenzimidazole polymer. The solvents may be selected from those commonly utilized in the formation of polybenzimidazole dry spinning solutions including N,N-dimethylacetamide, N,N-dimethylformamide, dimethylsulfoxide, and N-methyl-2-pyrrolidinone. The particularly preferred solvents are N,N-dimethylacetamide and N-methyl-2-pyrrolidinone. Additional representative solvents include formic acid, acetic acid, and sulfuric acid.

The polybenzimidazole polymer solution may be prepared, for example, by dissolving sufficient polybenzimidazole in the solvent to yield a final solution containing from about 0.5 to about 30.0 percent by weight of the polybenzimidazole polymer based on the total weight of the solution. The final determination of the concentration of the polybenzimidazole in the blend will depend on the desired characteristics of the membrane to be prepared. When the solution contains concentrations of polybenzimidazole less than about 1 percent, the blends obtained are less than optimum. When concentrations of polybenzimidazole approach about 30 percent, the polybenzimidazole solution must be heated to complete the dissolution process. Obviously the relative concentration between the polybenzimidazole polymer and the polyacrylate is also critical in the membrane formation. Therefore, it is preferred that the concentration of polybenzimidazole in solution ranges from about 1 to about 12 percent by weight, based on the total weight of the solution.

One suitable means for dissolving the polybenzimidazole polymer in the solvent is by mixing the materials at a temperature above the normal boiling point of the solvent, for example, about 25° C. to 120° C. above such boiling point, and at a pressure of 2 to 15 atmospheres for a period of 1 to 5 hours under constant stirring. The resulting solution is preferably filtered to remove any undissolved polybenzimidazole polymer. A minor amount of lithium chloride (from about 0.5 to about 5 percent by weight based on the total weight of the solution) optionally may be provided to prevent the polybenzimidazole polymer from phasing out of the solution upon standing for extended periods of time.

Although the polybenzimidazole solution may be prepared as previously discussed, a polybenzimidazole solution may also be prepared by dissolving into solution preformed polybenzimidazole products, such as fibers, prepared by any conventional fiber forming process. If this procedure is used, sufficient polybenzimidazole fibers are dissolved in a polybenzimidazole solvent to produce a solution with a concentration ranging from about 0.5 to about 30.0 percent by weight based on the total weight of the solution and preferably from about 1 to about 12 percent. The solvent utilized in the preparation of this solution is the same as that utilized in the formation of the polybenzimidazole polymer solution previously discussed. The polybenzimidazole solution prepared from polybenzimidazole products, such as fibers, may be prepared by mixing the preformed polybenzimidazole product in a sufficient quantity of the solvent and heating the solution at a temperature from about 80 to about 150° C. for a period of about 0.5 to about 4.0 hours under constant stirring. The resulting solution is preferably filtered to remove any undissolved polymer.

C. The Polyarylate

To this polybenzimidazole solution is added a polyarylate. Generally, the polyarylate used in the invention has the following unit formula:

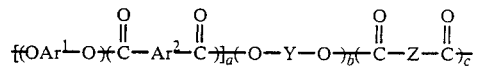

wherein $Ar^1$ and $Ar^2$ represent divalent aromatic moieties or mixtures thereof; wherein Y represents a divalent aliphatic moiety containing up to 6 carbon atoms, or mixtures thereof; wherein Z represents a divalent aliphatic moiety containing up to 6 carbon atoms, or mixtures thereof; and wherein "a" has a value of 0.5 to 1, "b" has a value of 0 to 0.5, and "c" has a value of 0 to 0.5, the sum of a, b and c being equal to 1.

Although other classes of polyarylates may be used in the compositions of this invention, the preferred polyarylates which may be used in the compositions and processes of this invention have repeating units of the following formula

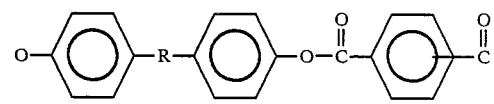

wherein R in the bisphenol moiety represents $-C(CH_3)_2-$ or $-SO_2-$ or $-O-$. The phthalate moiety may be from isophthalic acid, terephthalic acid or a mixture of the two at any ratios (i.e., ranging from 99 percent isophthalic acid and 1 percent terephthalic acid to 1 percent isophthalic acid and 99 percent terephthalic acid.)

The polyarylates from Celanese Corporate (Durel) and Union Carbide (Ardel) are preferred. Durel is an amorphous homopolymer with a weight average molecular weight of about 20,000 to 200,000. Ardel is prepared from bisphenol-A and a mixture of 50 mol percent each terephthalic and isophthalic acid chlorides by conventional methods. Different polyarylates may be blended in the compositions of the invention.

The polyarylates are only soluble in a few selected solvents. Both the Durel and Ardel polyarylates dissolved readily in methylene chloride, chloroform, N-methylpyrrolidinone, N,N-dimethylformamide and N,N-dimethylacetamide. Heating at 90° C. for ½ hour is required for dissolving concentrated polyarylate ($\geq 10$ percent) compositions.

D. Polybenzimidazole/Polyarylate Blend

The novel membranes of this invention are prepared from a composition comprising from about 5 parts by weight to about 95 parts by weight of a polyarylate and from about 95 parts by weight to about 5 parts by weight of the polybenzimidazole polymer.

Currently, polybenzimidazoles are on the order of twenty times the price of polyarylates. Polyarylates are commercially successful because of their generally good combination of properties, with the exception, of course, of poor resistance to chlorinated solvents. Those properties can be substantially improved by incorporating an amount of a relatively more expensive polybenzimidazole in a miscible blend with the polyarylate and producing a membrane. From this blend the beneficial properties of the polyarylates are retained and solvent resistance, thermal and physical properties are improved at a moderate additional cost. It is surprising that a minor amount of the polybenzimidazole can ameliorate the relatively weak properties of the polyarylate, i.e., poor resistance to chlorinated solvents and low thermal stability and physical properties (tenacity and modulus). At the same time, the less expensive polyarylate decreases the cost of the blend substantially below the cost of the polybenzimidazole and produces improved membranes.

If the blend of the invention is mostly comprised of polybenzimidazole, it is preferred that the amount of polyarylate in the blend be sufficient to make the polybenzimidazole more tractable and processable and also less susceptible to moisture. It is surprising that a minor amount of the polyarylate can ameliorate the weak properties of the polybenzimidazole, i.e., poor thermal plasticity and moisture regain. At the same time the less expensive polyarylate decreases the cost of the blend substantially below the cost of the polybenzimidazole.

If the blend of the invention is mostly comprised of polyarylate, it is preferred that the amount of polybenzimidazole in the blend be sufficient to render the polyarylate less sensitive to solvents, particularly chlorinated hydrocarbons. Preferably, the polybenzimidazole is present in an amount sufficient to result in a composition with greatly reduced solubility and low swelling, i.e., minimal weight loss in the blend of the invention when it is immersed in a chlorinated hydrocarbon for a period of time which would ordinarily result in the dissolving of a similar object made from a polyarylate itself. More preferably, the blends are comprised of from about 20 parts by weight to about 80 parts by weight of the polyarylate and from about 80 parts by weight to about 20 parts by weight of the polybenzimidazole. Most preferably, the blend should contain at least about 40 to about 60 parts by weight of the polybenzimidazole in order to impart to the polyarylate component greatly enhanced solvent-resistance in chlorinated solvents. In addition to improving solvent resistance, polybenzimidazole in the blend substantially increases the thermal stability and physical properties of the blend.

In order to prepare miscible blends the polybenzimidazoles and polyarylates may be first dissolved in a mutual solvent, e.g., N,N-dimethylformamide, N,N-dimethylacetamide, dimethylsulfoxide or N-methyl-2-pyrrolidinone or concentrated sulfuric acid, so that each polymer is present in the resulting solution at the desired concentration e.g., from about 1 percent to about 30 percent on a weight/volume basis, preferably from about 15 to 20 percent. It is preferred that the total concentration of the two polymers in the solution be such that the viscosity of the solution is acceptable for subsequent processing. The two polymers may be simultaneously dissolved in the solvent, or each polymer may be separately dissolved in separate volumes of solvent and desired portions of the resulting solutions can be mixed together to form a solution of the two polymers.

E. Membrane Formation

To form the membrane any conventional membrane formation procedure may be employed. In a preferred embodiment, the solution of the polybenzimidazole/polyarylate blend is deposited upon a support to form a wet film of the same. The nature of the support is not critical and may be selected from a variety of materials including ceramic, glass or metallic plates. The support is preferably provided with retaining elements or raised edges whereby the solution is confined to the surface thereof at the designed location until its consistency is such that retaining elements are no longer needed. Numerous techniques are available for the application of the solution to the support as will be apparent to those skilled in the art. For instance, the polybenzimidazole/polyarylate polymer blend may be simply poured upon a level support in a quantity sufficient for it to assume the desired uniform thickness. A blade optionally may be drawn over the surface of the wet film to aid the deposition of a wet film of uniform thickness.

The thickness of the wet film deposited upon the support is influenced by the desired thickness of the polybenzimidazole/polyarylate membrane ultimately to be produced. Generally the wet film is deposited upon the support in a substantially uniform thickness of about 0.1 to 30 mils and preferably 0.5 to 2 mils.

A quantity of solvents is next evaporated from the exposed surface of the wet film to allow formation of a relatively thin solid layer on the exposed surface of the same. The thin solid film commonly exhibits a thickness of about 0.01 to 20.0 microns and preferably about 1 to 10 microns. During the formation of the solid layer on the exposed surface of the film, the solvent present near the surface of the wet film which is flashed off and a thin coagulated solid layer or skin of the polybenzimidazole/polyarylate polymer blend remains. The remaining portion of wet film which supports the solid layer remains essentially unchanged while the solid layer is formed. The solid layer accordingly exhibits a density which is substantially greater than that of the remaining portion of the film which has not undergone coagulation and continues to possess liquid consistency.

The evaporation of solvent from the exposed surface of the wet film may be accomplished by a variety of techniques as will be apparent to those skilled in the art. For instance a stream of air or other gas, at ambient or at an elevated temperature may be simply directed at the exposed surface of the wet film. Alternatively, the wet film may be simply allowed to stand in an uncirculated gas environment wherein the residual degree of solvent evaporation is accomplished. The time required to form the desired thin solid layer upon the exposed surface of the wet film commonly ranges from about 5 seconds to about 30 minutes and preferably from about 15 seconds to 20 minutes.

The resulting film may then be dried, the temperature of drying dramatically affects the nature of the membrane produced. Drying membranes at relatively low temperatures i.e. about 25° C. to about 45° C. produces membranes exhibiting relatively high flux from about 100 to about 150 gfd when coagulated in water. When the membranes are dried at higher temperatures from about 100° C. to about 150° C., the membranes are characterized by lower flux i.e. about 40 to about 80 gfd when coagulated in water.

Although the nature of the coagulant also has an impact on the flux rate of the resultant membrane, regardless of which coagulant is used, when the membranes are dried at a relatively low temperature i.e., about 15° C. to about 40° C,, the flux is higher than when the membranes are dried at a higher temperature i.e., from about 100° C. to about 150° C. For example, in one preferred embodiment when ethylene glycol is used as the coagulant and the membrane is dried at a temperature of about 15° C. to about 40° C. for 20 minutes, the flux rate is about 40 to about 75 gfd while when the membrane is dried at a temperature of about 120° C., to about 150° C., the flux rate is about 20 to about 40 gfd.

The resulting membranes formed from the polybenzimidazole/polyarylate blend consist of an outer relatively thin surface layer formed during the evaporation step adjacent to a relatively thick layer of more porous structure formed during the subsequent wash step. The membranes are characterized by high thermal stability in comparison to conventional polyarylate membranes. Also the membranes exhibit a high degree of chemical stability and can continue to function in spite of contact with a wide variety of reagents and solvents including chlorinated solvents.

The resulting film bearing a thin solid layer upon its surface is next converted to a semipermeable membrane suitable for separating components of a solution by washing the same with a non-solvent for the polybenzimidazole/polyarylate blend which is capable of removing residual quantities of the polybenzimidazole/polyarylate solvent. During the wash step the remaining polybenzimidazole/polyarylate blend within the wet film is coagulated while the solvent which originally dissolved the same is removed. The wash medium is preferably methanol, acetone, ethylene glycol or water with a water or ethylene glycol, the preferred wash medium. The wash step is preferably carried out by immersing the film in the wash medium. Alternatively, any other conventional means for contacting the film with a wash medium may be utilized, such as by spraying the film with the same. In one preferred embodiment a water wash medium is provided at relatively cool temperatures of about 5° C. to about 30° C. The time required to accomplish coagulation of the remaining polybenzimidazole/polyarylate blend and substantially complete removal of residual solvent for the same varies with the temperature of the wash medium. Satisfactory wash times commonly range from about 30 seconds to about 20 minutes and preferably from about 2 to about 10 minutes. Considerably longer wash times may be employed but generally with no commensurate advantages.

The films may be post-treated with heat or sulfuric acid in order to minimize their shrinkage when subsequently subjected to heat and in order to increase their resistance to solvents, such as dimethylacetamide and N-methyl-2-pyrrolidinone, and acids, including concentrated inorganic acids, such as hydrochloric acid. After post-treatment, the membrane is no longer soluble in the solvents used to initially form the blends of the constituent polymers, e.g., dimethylacetamide or N-methyl-2-pyrrolidinone. Heating in air or in an inert atmosphere at a temperature of from about 200° C. to about 500° C. for a period of time from about 1 to about 30 minutes may be employed to stabilize the membranes. The time-temperature relationship to obtain the required results can be determined empirically. Preferably, heating at a temperature of from about 350° C. to about 400° C. may be used.

Alternatively, the product may be post-treated by treating the membrane with a sulfonating agent followed by heat setting the membrane at a temperature of from about 200° C. to about 500° C. for a period of time sufficient to minimize its shrinkage when subsequently subjected to heat and to increase its resistance to solvents and acids. A solution of from 1 to about 15 percent sulfonating agent followed by heat setting at temperature of from about 200° to about 500° C. may be used. The sulfonating agent may be sulfuric acid, sulfur trioxide, toluene sulfonic acid or naphthalene sulfonic acid. Preferably, post-treatment is accomplished by dipping the product in about a 5 percent sulfuric acid solution followed by heat setting at a temperature of from about 350° C. to about 400° C. for a period of time sufficient to minimize its shrinkage when subsequently subjected to heat and to increase its resistance to solvents and acid, the preferable dipping time is from about 5 minutes to about 2 hours.

The polybenzimidazole/polyarylate membranes produced by this process are quite useful in the separation of materials especially in the ultrafiltration size range, i.e., above a molecular weight of about 1200. As opposed to many conventional ultrafiltration membranes, the polybenzimidazole/polyarylate membrane produced by this process absorbs the materials being filtered rather than preventing its transfer through the membrane. Thus, the ability of the polybenzimidazole/polyarylate membrane to regenerate is critical to the utility of these membranes. It has been surprisingly found that these membranes have a high regeneration capacity and have been effective as separatory membranes after repeated regeneration processes. To regenerate the membranes after absorption, they are washed with a weak acid solution, preferably an inorganic acids, such as about a 5 percent sulfuric acid solution. The membrane is treated with the acid by washing the membrane with the acid solution in a conventional washing procedure or by dipping the membrane in the acid solution for a period from about 5 minutes to about 30 minutes. Following the acid bath the membrane can be dried as previously disclosed and reused as an ultrafilter.

The following examples are given as specific illustrations of the invention. All parts and percentages are by weight unless otherwise stated. It is understood however, that the invention is not limited to the specific details set forth in these examples.

EXAMPLE 1

A polybenzimidazole starting solution was prepared by stirring 45 grams of poly-2,2'-phenylene-5,5'-bibenzimidazole (0.4 i.v.) polymer in fiber form with 425 grams of N-methyl-2-pyrrolidinone and 5.0 grams of lithium chloride for 3 hours in a 2,000 ml. reaction vessel at a temperature of 220°. This solution was then filtered to remove any residual solids. To the solution was added 30 grams Ardel D-100, polyarylate (sold by Union Carbide Corporation prepared from bisphenol-A and a mixture of 50 mole percent each terephthalic and isophthalic acid chlorides by conventional methods). The mixture was heated at a temperature of 100° C. for 3 hours and filtered through a 60 micron filter followed by a 5 micron filter in order to remove any residual solids to form a polybenzimidazole/polyarylate dope.

The polybenzimidazole/polyarylate dope was cast on a non-woven polyester fabric using a conventional slot-die casting technique at a line speed of 3 feet per minute. After formation, the membrane was dried at room temperature for 20 minutes and then coagulated in a conventional water wash bath at 20° C. for 10 minutes.

The resulting membrane exhibited the following flux rates at the following pressures:

| Pressure (p/s/i) | Flux (g/f/d) |
| --- | --- |
| 20 | 58–61 |
| 30 | 79–86 |
| 40 | 110 |
| 50 | 126–142 |

A picture of the membrane morphology is illustrated in FIG. 1. This membrane appears to consist of a fibrous network which contains large voidy areas and rounded to oval shaped particles. The fibrous network appears to branch out radially in all directions and form a voidy structural network.

EXAMPLE 2

A new membrane was cast using the same process as was used in Example 1 except the membrane was coagulated in ethylene glycol at a temperature of 20° C. for 10 minutes. The flux of the membrane at various pressures was as follows:

| Pressure (p/s/i) | Flux (g/f/d) |
|---|---|
| 20 | 22–24 |
| 30 | 33–37 |
| 40 | 49–51 |
| 50 | 60 |

EXAMPLE 3

The process of Example 1 was repeated except the membrane was dried at a temperature of 140° C. for 1 minute and then was coagulated in water for 10 minutes. The resulting membrane exhibited a flux rate of 49 g/f/d at a pressure of 50 psi.

EXAMPLE 4

The process of Example 2 was repeated, however the drying temperature was 140° C. for 1 minute and ethylene glycol was used as the coagulant. Coagulation occured at a temperature of 20° C. for 10 minutes. The flux rate exhibited by the membrane was 32 g/f/d at a pressure of 50 p/s/i.

EXAMPLE 5

To test the regeneration properties of the membranes produced by this process, the membrane of Example 2 was placed in an ultra filtration cell. A vitamin $B_{12}$ solution of 0.005 gram/l concentration was fed through the membrane at 20 p/s/i. Once the membrane was saturated with the vitamin $B_{12}$ solution, it was regenerated by washing the membrane with an acid solution of at a pH of 2 for 3 minutes at a pressure of 20 psi. This process was repeated a second and third time. In each of these processes the flux of the sample after regeneration was 25 g/f/d at 20 p/s/i. Each separation showed a complete removal of the vitamin B-12.

As is readily apparent from these Examples, high quality separation membranes can be produced from a combination of polybenzimidazole and polyarylate polymers. These membranes exhibit high flux rates and good separation qualities of molecules with a molecular weight above about 1200. In addition, the membranes show good regeneration capabilities for reuse. They are of great utility in many separatory processes including ultrafiltration and reverse osmosis and exhibit superior characteristics to membranes produced solely from either polybenzimidazole or polyarylate polymers.

What is claimed:
1. A membrane prepared by the process of:
 a. preparing a polybenzimidazole solvent solution;
 b. blending a polyarylate with the polybenzimidazole solvent solution; and
 c. forming a membrane from the polybenzimidazole/polyarylate blend.
2. The membrane of claim 1 wherein the solid content of the polybenzimidazole/polyarylate blend is from about 1 to about 30 by weight based on the total solution weight.
3. The membrane of claim 1 wherein the solid content of the polybenzimidazole/polyarylate blend is from about 15 to about 20 by weight based on the total solution weight.
4. The membrane of claim 1 wherein the polybenzimidazole is blended with the polyarylate at a ratio of 20 parts to about 80 parts by weight polyarylate and from about 80 parts by weight to about 20 parts by weight polybenzimidazole.
5. The membrane of claim 1 wherein the polybenzimidazole is blended with the polyarylate at a ratio of 40 parts to about 60 parts by weight polyarylate and from about 60 parts by weight to about 40 parts by weight polybenzimidazole.
6. The membrane of claim 1 wherein the solvent for the polybenzimidazole is selected from the group consisting of N,N-dimethylformamide, N,N-dimethylacetamide, dimethylsulfoxide, N-methyl-2-pyrrolidinone and sulfuric acid.
7. The product of claim 1 wherein the polybenzimidazole polymer consists essentially of recurring units of the formula:

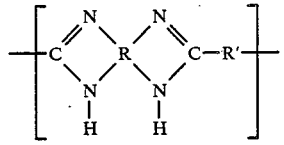

where R is a tetravalent aromatic nucleus with the nitrogen atoms forming the bibenzimidazole rings being paired upon adjacent carbon atoms, i.e., ortho carbon atoms, of the aromatic nucleus, and R' is a divalent substituent selected from aliphatic, alicyclic and aromatic radicals. Illustrative of R' substituents are divalent organic radicals containing between about 2–20 carbon atoms, such as ethylene, propylene, butylene, cyclohexylene, phenylene, pyridine, pyrazine, furan, thiophene, pyran, and the like.
8. The process of claim 1 wherein the polybenzimidazole polymer starting material is comprised of recurring monomeric units of:

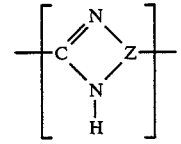

wherein Z is an aromatic nucleus having the nitrogen atoms forming the benzimidazole ring paired upon adjacent carbon atoms of the aromatic nucleus.
9. The process of claim 1 wherein the polybenzimidazole polymer is poly-2,2'-(m-phenylene)-5,5'-bibenzimidazole.
10. The process of claim 1 wherein the polyarylate polymer consists essentially of recurring units of the formula:

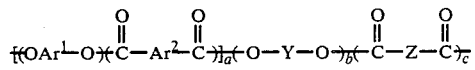

wherein $Ar^1$ and $Ar^2$ represent divalent aromatic moieties or mixtures thereof; wherein Y represents a divalent aliphatic moiety containing up to 6 carbon atoms, or mixtures thereof wherein Z represents a divalent aliphatic moiety containing up to 6 carbon atoms, or mixtures thereof; and wherein a has a value of 0.5 to 1, b has a value of about 0 to 0.5, and c has a value of 0 to 0.5, the sum of a, b and c being equal to 1;

11. The product of claim 1 wherein polyarylate polymer is contains recurring units of the formula:

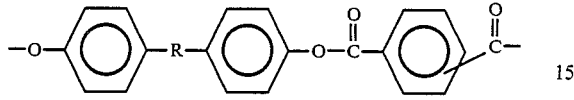

wherein R in the bisphenol moiety represents —C(CH$_3$)$_2$— or —SO$_2$— or —O— and the phthalate moiety may be from isophthalic acid, terephthalic acid or a mixture of the two.

12. The membrane of claim 1 wherein the polybenzimidazole polyarylate membrane is dried at a temperature ranging from about room temperature to about 200° C.

13. The membrane of claim 1 wherein the polybenzimidazole polyarylate membrane is dried at a temperature from about 25° C. to about 45° C.

14. The membrane of claim 1 wherein the polybenzimidazole polyarylate membrane is dried at a temperature from about 100° C. to about 150° C.

15. The membrane of claim 1 which is coagulated in water.

16. The membrane of claim 1 which is coagulated in ethylene glycol.

17. The membrane of claim 1 which is post-treated by heating at a temperature of from about 200° C. to about 500° C. for a period of time from about 1 to about 30 minutes.

18. The membrane of claim 1 which is post treated by treating with a sulfonating agent followed by heat setting at a temperature from about 200° to about 500° C. for a period of time from about 5 minutes to about 2 hours.

19. A membrane prepared by the process of:
a. preparing a polybenzimidazole solvent solution;
b. blending a polyarylate with the polybenzimidazole solvent solution wherein the total solid content of the polybenzimidazole/polyarylate blend is from about 1 to about 30 percent by weight based on the total solution weight and wherein the polybenzimidazole is blended with the polyarylate at a ratio of 40 parts to about 60 parts by weight polyarylate and from about 60 parts to about 40 parts by weight polybenzimidazole; and
c. forming a membrane from the polybenzimidazole/polyarylate blend.

20. A membrane prepared by the process of:
a. preparing a polybenzimidazole solvent solution wherein the polybenzimidazole polymer consists essentially of recurring units of the formula:

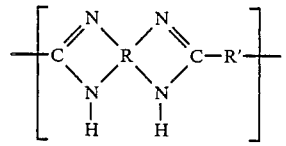

where R is a tetravalent aromatic nucleus with the nitrogen atoms forming the bibenzimidazole rings being paired upon adjacent carbon atoms, i.e., ortho carbon atoms, of the aromatic nucleus, and R' is a divalent substituent selected from aliphatic, alicyclic and aromatic radicals. Illustrative of R' substituents are divalent organic radicals containing between about 2-20 carbon atoms, such as ethylene, propylene, butylene, cyclohexylene, phenylene, pyridine, pyrazine, furan, thiophene, pyran, and the like;

b. blending with the polybenzimidazole solvent solution a polyarylate polymer which consists of essentially of recurring units of the formula:

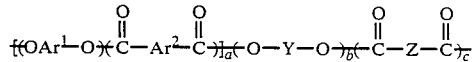

wherein $Ar^1$ and $Ar^2$ represent divalent aromatic moieties or mixture thereof; wherein y represents a divalent aliphatic moiety containing up to 6 carbon atoms, or mixture thereof; wherein Z represents a divalent aliphatic moiety containing up to 6 carbon atoms, or mixtures thereof; and wherein a is 0.5 to 1, b is 0 to 0.5 and c is 0 to 0.5 and the sum of a, b and c is equal to 1 and wherein the solid content of the polybenzimidazole/polyarylate blend is from about 15 to about 20 percent by weight based on the total solution weight and wherein the polybenzimidazole is blended with the polyarylate at a ratio of 40 parts to about 60 parts by weight polyarylate and from about 60 parts to about 40 parts by weight polybenzimidazole; and
c. forming a membrane from the polybenzimidazole/polyarylate blend.

* * * * *